United States Patent [19]

Stearns et al.

[11] 3,896,675
[45] July 29, 1975

[54] HIGH SPEED HYDRAULIC SENSOR

[75] Inventors: Charles F. Stearns, East Longmeadow, Mass.; Kenneth P. Hansen, Enfield, Conn.

[73] Assignee: United Aircraft Corporation, East Hartford, Conn.

[22] Filed: Nov. 23, 1973

[21] Appl. No.: 418,633

[52] U.S. Cl. ............................... 73/497; 73/502
[51] Int. Cl.² ........................................ G01P 3/28
[58] Field of Search ............ 73/497, 502, 521, 523; 137/47; 415/36

[56] References Cited
UNITED STATES PATENTS

| | | | |
|---|---|---|---|
| 2,857,150 | 10/1958 | Sharp | 73/523 X |
| 2,874,764 | 2/1959 | Booth et al. | 73/521 X |
| 3,625,627 | 12/1971 | Stateell | 73/521 X |

*Primary Examiner*—James J. Gill
*Attorney, Agent, or Firm*—Norman Friedland

[57] ABSTRACT

A hydromechanical high speed sensor is designed to accurately measure speed by utilizing a rotating valve providing a pumping action and a buoyant ball mounted in the valve for metering fluid in a closed circuit and being sized to compensate for changes in fluid density.

6 Claims, 4 Drawing Figures

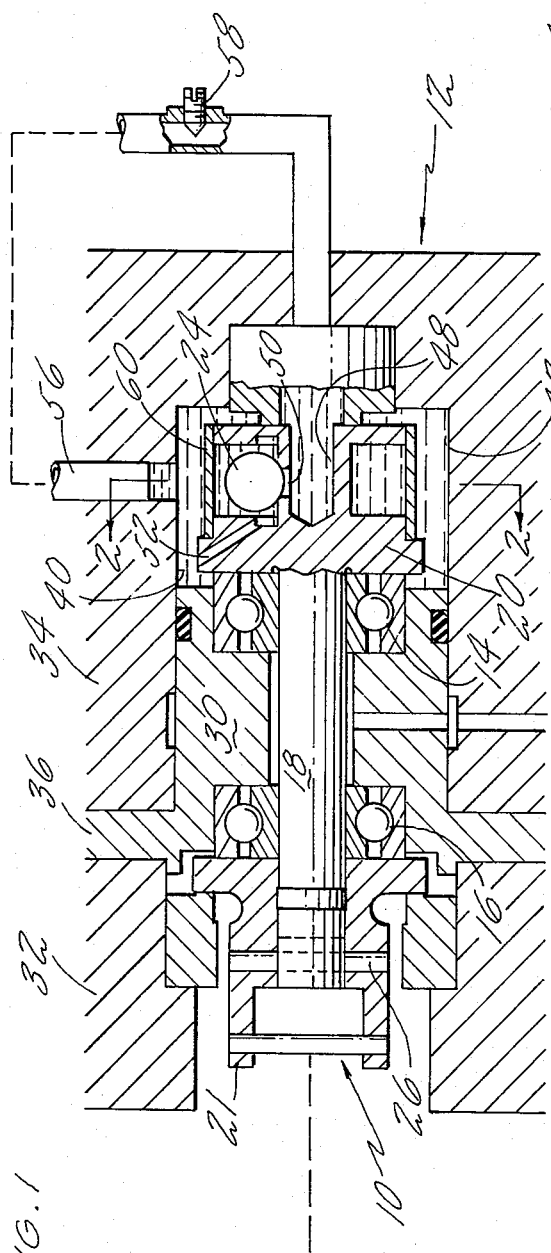
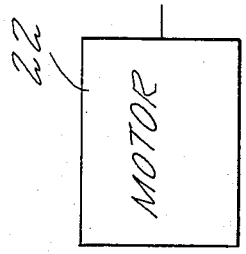
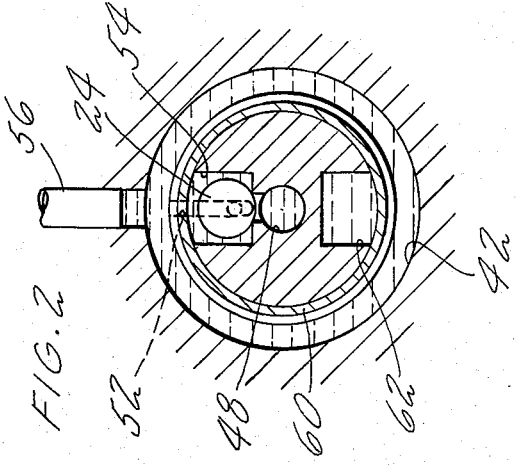
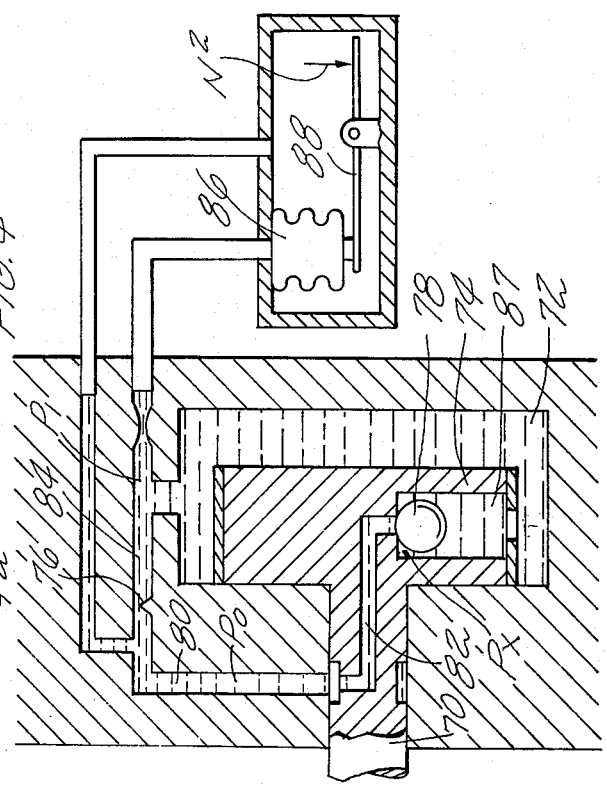
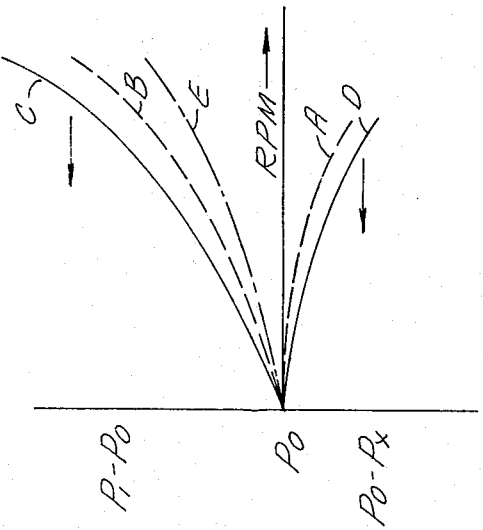

HIGH SPEED HYDRAULIC SENSOR

BACKGROUND OF THE INVENTION

This invention relates to speed sensors and more particularly to a hydromechanical speed transducer that produces a fluid pressure signal indicative of sensed speed regardless of the fluid density occasioned by temperature changes and/or the use of different fluids.

The customary speed sensor, particularly for fuel controls designed for turbine type power plants for aircraft or industrial applications typically employs a flyball governor or sensor which by virtue of the pivotable flyballs serve to produce a mechanical output signal which is proportional to the speed to which it is subjected. Not only are the flyball speed sensors considered to be complex but are also relatively expensive and are not particularly suitable for speeds that are in the 50,000 or greater revolutions per minute range.

We have found that we can obtain an economical, simple to fabricate and accurate speed measuring device by designing a rotating valve that serves to pump the fluid through an orifice which is metered by a buoyant ball whose combined effect produces a pressure which is indicative of the speed being sensed and compensates for changes in fluid density.

The advantage of using a buoyant ball, in contrast to conventional flyball sensors, is that the ball force is toward the center or rotational axis. This means that as fluid density changes the ball force changes in a manner to change the pressure drop and hence compensates for changes in the pressure produced by rotational speed in a likewise direction, thereby counteracting the change in density. Thus, proper sizing of the ball has the affect of compensating for the changes in density and thereby holding the speed signal constant for a given sensed speed and offering a more accurate control.

SUMMARY OF THE INVENTION

An object of this invention is to provide an improved high speed sensor that is reliable and accurate.

A still further object of this invention is to provide hydromechanical means for sensing speed and producing a fluid pressure signal indicative thereof regardless of fluid density.

A still further object of this invention is to provide hydromechanical means for measuring speed which includes a buoyant ball metering fluid through a rotating valve which ball is sized to eliminate the effects of changes in density either occasioned by changes in temperature or fluid.

A still further object of this invention is to provide a hydromechanical sensor including a rotating valve serving to pump fluid and a buoyant ball metering said fluid which is characterized as being relatively simple and inexpensive to fabricate and is relatively reliable and accurate.

Other features and advantages will be apparent from the specification and claims and from the accompanying drawing which illustrates an embodiment of the invention.

BRIEF DESCRIPTION OF THE DRAWING

FIG. 1 is a view partly in section and partly in schematic illustrating the details of this invention.

FIG. 2 is a sectional view taken along lines 2—2 of FIG. 1.

FIG. 3 is a graphical representation showing a plot of the pressure drop at certain locations in the sensor depicted in FIG. 1 for illustrating the effect of changes in density.

FIG. 4 is a view partly in section and partly in schematic illustrating an application of this invention.

DESCRIPTION OF THE PREFERRED EMBODIMENTS

Reference is now made to FIGS. 1 and 2 which show the details of this invention as comprising a rotating valve generally illustrated by numeral 10 rotatably supported in housing 12 by bearings 14 and 16 having a reduced diameter portion 18 and a larger diameter portion 20. Motor 20 shown in FIG. 1 drives the collar 21 (as schematically shown) which is pinned to the valve portion 18 by suitable pin 26 to be driven thereby. Sleeve 30 carrying flange 36 sandwiched between casing members 32 and 34 terminates short of the end of the central bore 40 formmed in the housing 12 to define cavity section 42. The larger diameter portion 20 of the rotating valve 10 is disposed in this cavity which is completely filled with fluid as shown. A closed fluid circuit interconnecting the buoyant ball 24 includes a central passage 48, radially extending passage 50, drilled passage 52, the cavity portion 42 and fluid connecting line 56.

As can be seen from FIG. 2 the larger diameter portion 20 of rotating valve 10 contains a drill passage 54 in which is disposed buoyant ball 24 which is adapted to move in proximity to the radially extending passage 50. Buoyant ball 24 serves to change the metering area of the opening of passage 50 for the purpose to be described hereinbelow. A sheet metal strip 60 surrounds the larger diameter portion 20 to overlie bore 54 to prevent ball 24 from falling out. A complementary bore 62 is formed diametrically opposite bore 54 and likewise filled with fluid for balancing purposes.

While the particular embodiment just described is a test fixture for testing the efficacy of this invention, which has proven to be both reliable and accurate at speeds exceeding 40,000 rpm, it will be understood that once the principles are understood the applications for this device are numerous. It is to be understood that the rotating motor serves to rotate the rotating valve 10 at the speed to be measured. The pressure developed across fixed restriction 58 by virtue of the pumping action of hole 52 and the metering of ball 24 would be indicative of the speed at which the motor is rotating in this particular embodiment, regardless of the density changes.

From the foregoing it is apparent that as valve 10 rotates the fluid due to the centrifugal force, the pumping action of hole 52, pumps the fluid and drives it through line 56 through restriction 58. This pressure ported to restriction 58 produces a pressure drop. As the flow continues it passes ball 24 where the pressure drop from one side of the ball to the other is controlled by the force of the ball 24. The force on the ball 24 is a function of the ball buoyancy and rotational velocity. The advantage of using a buoyant ball rather than conventional flyball sensors is that the ball force is toward the center. This means that as fluid density changes in the increase direction the ball force increases in toward the center producing a larger pressure drop. The ball weight and size can be selected so that this increase will compensate for increase in pressure produced by the pump with increased density. In other words the drop across orifice 58 remains constant.

The method of selecting the ball size to show the efficacy of the speed sensor shown in FIG. 1 is described below. It is to be understood that the mathematical derivation is merely exemplary of one example of a design configuration, but is useful in an understanding of the invention. The symbols used in this example are as follows:

$P_o - P_x =$ is the pressure drop across ball 24
$N =$ rotational speed
$D_f =$ fluid density
$D_B =$ compensation ball density
$V_B =$ compensation ball volume
C.G. = center of gravity
$K =$ the design constant of the pump, taking into consideration the difference in the square of the pump's inlet and exit diameters and its pressure coefficients
$R_B =$ radial distance from center of rotation to ball C.G.
$D_N =$ compensation valve seat diameter
$P_1 \ P_o =$ output pressure signal indicative of sensed speed
$P_1 - P_x =$ pump generated pressure Eq. 1
$$P_1 - P_o = (P_1 - P_x) - (P_o - P_x)$$

Eq. 2
$$P_1 - P_x = K D_f N^2$$

Eq. 3
$$P_o - P_x = \frac{(D_f - D_B) V_B R_B \frac{2\pi}{60} N^2}{\pi/4 \, D_N^2}$$

substituting into Eq. 1 yields

Eq. 4
$$P_1 - P_o = K D_f N^2 - \left[ \frac{(D_f - D_B) V_B R_B \frac{2\pi}{60} N^2}{\frac{\pi}{4} D_N^2} \right]$$

rearranging yields

Eq. 5
$$P_1 - P_o = \left[ \left( K - \frac{V_B R_B \frac{2}{15}}{D N_2} \right) D_f + \frac{V_B R_B \frac{2}{15} D_B}{D_N^2} \right] N^2$$

if $$\frac{V_B R_B \frac{2}{15}}{D_N^2}$$

is made equal to $K$ then $$P_1 - P_o = K D_B N^2 \text{ or } \frac{V_B R_B \frac{2}{15} D_B N^2}{D_N^2}$$

which shows that $(P_1 - P_o)$ is insensitive to changes in fluid density as long as $$K = \frac{V_B R_B \frac{2}{15}}{D_N^2}$$

This really is the equation for curve $E$ in FIG. 3.

The efficacy of the equations above take into consideration the pressure head created in line 82 in that portion normal to the rotating axis. For this reason it includes two portions normal to the axis of rotation each producing a force on the fluid that is equal and opposite, this cancelling each other out.

The buoyant ball 24 essentially controls the pressure drop across buoyant ball 24 so that the pressure drop across fixed restriction 58 remains at a constant value for a given rotational speed regardless of changes in density caused by temperature or different type fluids. By maintaining this value constant the speed sensor obviously is insensitive to changes in density and thus making it more accurate sensor than the heretofore known types. FIG. 3 and FIG. 4 demonstrate this feature. The sensor in FIG. 4 is similar to the one in FIG. 1 but is a more schematic representation and it also illustrates one example how the speed signal can be implemented.

As noted in FIG. 4 the rotating valve is disposed in fluid chamber 72, where the radial hole 87 in larger diameter portion 74 serves to pump the fluid across fixed restriction 76 to ball 78 via line 80 and passage 82. The complete closed circuit includes passage 84 so there is communication upstream and downstream of ball 78. If the pressure drop across ball 78 that is $P_o - P_x$ is plotted as is shown in FIG. 3 the curve A would result. A plot of the pressure rise across the radial hole 87 in 74 $(P_1 - P_x)$ would result in curve B of FIG. 3. The sum of those two curves results in curve E, i.e., the pressure drop across the fixed orifice 76.

Assume a change in temperature of the fluid in decrease direction thereby increasing the fluid density. Because of the buoyancy effect of ball 78 it will move closer to the end of passage 82 and restrict the flow passing therethrough and hence increase the pressure drop across the ball $(P_o - P_x)$ resulting in curve D. The pressure rise across 87 $(P_1 - P_x)$ increases with increased fluid density resulting in curve C. Summing curve C and D as was done with curves A and B for any given speed (RPM) results again in curve E, thus holding the pressure drop across orifice 76 to a constant value.

This signal can be applied for any application where it is desirable to have a hydromechanical apparatus producing a direct speed signal by picking off the pressure drop across fixed restriction 76. In this instance pressure upstream of fixed restriction is applied internally to bellows 86 and the reference pressure or pressure downstream of restriction 76 is applied externally of bellows 86. Thus, the pressure force produced by bellows 86 is applied to fulcrum lever 88 to be used in any manner desired. For example the fulcrumed lever 88 may position a flapper in a servo system. Obviously, the output signal is indicative of N, i.e., $N^2$.

If the flow of fluid in the closed loop circuit generates excessive heat, this can be dissipated by conventional heat exchange means or the circuit can be opened.

What has been shown by this invention is simple means that senses speed that is insensitive to density changes and hence is accurate and quite suitable for high speed applications.

It should be understood that the invention is not limited to the particular embodiments shown and described herein, but that various changes and modifications may be made without departing from the spirit or scope of this novel concept defined by the following claims.

We claim:

1. A high speed sensor driven by rotating means whose speed is intended to be measured, said sensor including a closed loop fluid circuit having a rotating and nonrotating portion, said rotating portion having fluid pumping means and valve means, a fixed restriction disposed in said nonrotating portion intermediate said valve means and said pumping means in flow relation, said valve means including a ball disposed adjacent an orifice formed in said rotating portion having a preselected buoyancy to impart a force in the direction toward the center of rotation of the rotating portion so as to change the pressure drop across said orifice as a function of fluid density for a given speed of the rotating means, said pumping means varying the flow through said fixed restriction as a function of speed of the rotating means such that the pressure drop thereacross is indicative of said speed and said buoyant ball maintains a constant pressure drop across said restriction for a given speed of said rotating members.

2. A high speed sensor as claimed in claim 1 including a casing having a bore, an annular member disposed in said bore, said bore and passage means in said annular member forming a part of said closed loop fluid circuit.

3. A high speed sensor as claimed in claim 2 wherein said annular member rotates about its axis of rotation and a passage formed in said annular member disposed transverse relative to said axis pumps the fluid in said closed loop fluid circuit.

4. A high speed sensor as claimed in claim 3 including an orifice formed in said annular member transverse to and in proximity to said axis and at the low pressure side of said pumping passage and said ball being freely mounted in a radial slot in said annular member so as to cooperate with said orifice to vary its opening.

5. A high speed sensor comprising a rotating member and a nonrotating member, said rotating and nonrotating member having fluid passageways having a passage extending angularly relative to the axis of rotation of said rotating member, a fluid connection including an orifice formed in said rotating member in proximity to said passage and to said axis of rotation interconnecting said passage and orifice to define a closed fluid loop, a ball whose buoyancy is preselected to impart a force in the direction of the center of rotation of the rotating member disposed adjacent to said orifice for regulating the area thereof so as to change the pressure drop as a function of fluid density across said orifice at a given speed of said rotating member, a restriction in said fluid connection having its pressure drop across said restriction maintained constant with variation in density by said ball so as to be indicative of the speed of said rotating member independent of fluid density changes and said passage pumping fluid through said restriction.

6. A high speed sensor comprising a fixed housing having a bore, a rotatable spindle having a central axis rotatably supported in said bore, a passageway formed in said spindle extending transverse to said axis, a buoyant ball whose buoyance is preselected to impart a force in the direction toward said axis when rotating disposed in said passageway adjacent an orifice formed in said spindle communicating with said passageway, fluid connection means including means for pumping fluid interconnecting said passageway and the downstream and upstream side of said orifice, forming a closed loop circuit and being completely filled with fluid whereby the pumping effect is proportional to the rotation, a fixed restriction in said fluid connection means, the size of said passageway being dimensioned so that said buoyant ball moves transversely with respect to said axis when said spindle is rotated at or proportional to the speed intended to be measured for adjusting the area of said orifice to vary the pressure across said fixed restriction as a function of the speed of said spindle and adjust the area of said orifice for a change in density of said fluid to maintain the pressure drop across said restriction at a constant value for a given speed of said spindle.

* * * * *

UNITED STATES PATENT OFFICE
CERTIFICATE OF CORRECTION

PATENT NO. : 3,896,675

DATED : July 29, 1975

INVENTOR(S) : Charles F. Stearns and Kenneth P. Hansen

It is certified that error appears in the above-identified patent and that said Letters Patent are hereby corrected as shown below:

Column 2, line 15: "Motor 20" should be -- Motor 22 --

Column 2, line 20: "formmed" should be -- formed --

Column 3, line 39: delete from Eq. 3 " $\frac{2\pi}{60}N2$ " and substitute therefor -- $\left(\frac{2\pi}{60}N\right)^2$ --

Column 3, line 45: delete from Eq. 4 " $\frac{2\pi}{60}N2$ " and substitute therefor -- $\left(\frac{2\pi}{60}N\right)^2$ --

Column 3, line 55: delete from Eq. 5 " $\frac{2}{15}$ ", both occurrences, and substitute therefor -- $\frac{\pi}{225}$ --

Column 3, line 55: In Eq. 5, "$DN_2$" should be -- $D_N^{\,2}$ --

(continued on next page)

UNITED STATES PATENT OFFICE
CERTIFICATE OF CORRECTION

PATENT NO. : 3,896,675
DATED : July 29, 1975
INVENTOR(S) : Charles F. Stearns and Kenneth P. Hansen Page 2 of 2

It is certified that error appears in the above-identified patent and that said Letters Patent are hereby corrected as shown below:

Column 3, line 64: delete from the numerator " $\frac{2}{15}$ " and substitute therefor -- $\frac{\pi}{225}$ --

Column 4, line 1 : delete from the numerator " $\frac{2}{15}$ " and substitute therefor -- $\frac{\pi}{225}$ --

Column 4, line 10: delete from the numerator " $\frac{2}{15}$ " and substitute therefor -- $\frac{\pi}{225}$ --

Column 4, line 21: "this" should be -- thus --

Signed and Sealed this

Twenty-eighth Day of June 1977

[SEAL]

Attest:

RUTH C. MASON
Attesting Officer

C. MARSHALL DANN
Commissioner of Patents and Trademarks